(12) United States Patent
Gordon (10) Patent No.: US 8,636,182 B1
(45) Date of Patent: Jan. 28, 2014

(54) PICKUP TRUCK STORAGE DEVICE

(76) Inventor: Joel Gordon, Owings Mills, MD (US)

( * ) Notice: Subject to any disclaimer, the term of this patent is extended or adjusted under 35 U.S.C. 154(b) by 297 days.

(21) Appl. No.: 12/942,811

(22) Filed: Nov. 9, 2010

Related U.S. Application Data (60) Provisional application No. 61/280,771, filed on Nov. 9, 2009.

(51) Int. Cl.
*B60R 9/00* (2006.01)

(52) U.S. Cl.
USPC ............ 224/404; 224/403; 224/282; 224/548; 224/553

(58) Field of Classification Search
USPC ......... 224/403, 404, 282, 553, 556, 548, 542, 224/544, 310, 321; 296/37.6; 414/546
See application file for complete search history.

(56) References Cited

U.S. PATENT DOCUMENTS

| | | | | |
|---|---|---|---|---|
| 3,765,713 | A | * | 10/1973 | Suitt .................................. 296/3 |
| 4,150,861 | A | * | 4/1979 | Dufrancatel .................. 312/266 |
| 4,266,821 | A | * | 5/1981 | Gillet ........................... 296/37.6 |
| 4,469,364 | A | | 9/1984 | Rafi-Zadeh |
| 4,564,167 | A | | 1/1986 | Smith |
| 5,303,969 | A | | 4/1994 | Simnacher |
| 6,006,971 | A | | 12/1999 | Coleman et al. |
| 6,010,046 | A | * | 1/2000 | Neeser ........................... 224/281 |
| 6,557,917 | B1 | | 5/2003 | Colcombe |
| 6,588,720 | B1 | * | 7/2003 | Revette ....................... 248/311.2 |
| 6,626,479 | B1 | | 9/2003 | Skoug |
| 6,929,303 | B1 | * | 8/2005 | Sharples ...................... 296/37.6 |
| 2004/0134953 | A1 | * | 7/2004 | Perez ............................. 224/403 |

* cited by examiner

*Primary Examiner* — Adam Waggenspack
(74) *Attorney, Agent, or Firm* — Rothwell, Figg, Ernst & Manbeck, P.C.

(57) ABSTRACT

A device for movably mounting a storage container in relation to the storage bed of a pickup truck. The device includes a container support frame with a mounting member configured to be fixedly secured in relation to the pickup truck storage bed, and a lift arm having a first end coupled to the container support frame for pivotal movement about a first pivot axis and a second end configured to be coupled to the storage container for pivotal movement about a second pivot axis. The second end of the lift arm is movable along an arcuate path about the first pivot axis between a stowed position in which the storage container is disposed between the side rails and an extended position in which the storage container is disposed above a side rail. The storage container is pivotable about the second pivot axis to maintain an upright orientation in the stowed and extended positions, providing a variety of convenient access and storage options. Also, the frame can be confined to a very small portion of the storage bed or hidden within existing components of the storage bed to allow substantially unimpeded top and rear access to the storage bed.

17 Claims, 8 Drawing Sheets

PICKUP TRUCK STORAGE DEVICE

CROSS-REFERENCE TO RELATED APPLICATION

This application claims priority to U.S. Provisional Patent Application Ser. No. 61/280,771, filed on Nov. 9, 2009, the disclosure of which is incorporated herein in its entirety.

BACKGROUND OF THE INVENTION

1. Technical Field

The present invention relates generally to a device for positioning one or more storage containers in the cargo bed of a pickup truck and, more particularly, to a device that can lift one or more storage containers from a stowed position within the cargo bed to an extended position above the rails of the cargo bed.

2. Background Information

A variety of storage boxes have been developed for pickup trucks, to be positioned about or within the cargo or bed area of the truck for the purpose of being able to securely transport smaller items such as tools, hardware and equipment for personal and/or business purposes.

Conventional pickup truck storage boxes are typically made of steel, aluminum or plastic and can be permanently or semi-permanently mounted at either the forward position of the truck bed just behind the cab and/or located along and atop or just inside or both atop and just inside the rails of the truck bed.

To access the first mentioned storage box mounted just behind the cab, one usually must climb into the bed of the truck to access the container, whereby the box, and the individual accessing the box, both require use of sometimes valuable and limited bed real estate.

Another type of storage box can be positioned along the side rails of the truck bed, and is thereby more easily accessible from the street, and less demanding of the truck bed's storage or hauling space. However, as there are many individuals that use their pickup trucks for both work and personal use, it may sometimes be preferred that the storage boxes be less visible. Further, having such an easy accessible position along the sides of the truck, make there accessibility more inviting to potential break-in by thieves.

Another risk associated with the variety of currently marketed storage boxes that sit atop any bed rail, is that they cause a reduction of visibility and therefore pose a driving hazard.

SUMMARY OF THE INVENTION

Accordingly, it is a primary object of the present invention to overcome the above-mentioned disadvantages of the prior art and to improve storage systems that are used within or about the cargo space of a pickup truck or similar vehicle.

Another object in one or more embodiments is to allow for the storage container positioning device to be retrofitable to a variety of trucks made by different manufacturers, as well as allow easy installation and removal and compatibility for use in a variety of trucks where a variety of container sizes made of a range of suitable materials can easily install to the device.

Another object in one or more embodiments is to provide options to the customer ranging from motor driven to manual operation as driving means to manipulate and cause one or more storage containers to move between predefined positions and/or to be held in a pre-defined position.

The present invention is generally characterized as a device that may temporarily or permanently mount in the cargo space or bed of a truck, to which storage units, such as: boxes, or trays are mounted, and to which their position can be selectively altered about the bed of the truck directed by the operator or programmable control. In embodiments, the storage unit(s) can have their position manipulated to a first position easily accessible from a street standing position, where further, this same first position provides additional bed space through the act of moving the unit(s) from within the bed space to an up and over bed rail position. In the second, stowaway position, the storage unit(s) is lowered near to or upon the bed surface, making the storage units less visible, more secure, and having a lower center of gravity. In addition, in embodiments, the same storage unit(s) or positioning apparatus fixture may act as a mounting platform from which a support means may attach providing anchorage for a tonneau cover and/or support means to which a ladder rack system may mount.

Further, in embodiments, the storage units may be lowered upon or near to or sandwich cargo material, to aid in further securing or stabilizing of same material or objects to make less likely of escape or become unstable during transport.

In embodiments, the position of the box(es) generally maintain an upright position throughout their travel as guided and controlled by the supporting/lifting storage device using stabilizing mechanisms such as: four bar linkage means, upper centered pivot arrangement utilizing gravity to maintain upright position, a combination direct lifting of the container(s) on a vertical plane, then swinging inward and outward on the horizontal plane, gearing systems, or use of a horizontal guide rail coupled to and slide-able with both the left and right storage containers to disallow box tilting. It should be appreciated that a variety of methods can be implemented to disallow tilting of the containers during positioning and/or at rest.

Some of the advantages of embodiments of the invention include the ability to move storage containers between multiple positions relative to the truck storage bed to facilitate security of the containers in transit, provide easier access to the contents of the containers from within the bed or from a street standing position, free-up cargo space useful when hauling larger volumes, and/or clamp items in the lateral space between the storage containers and/or in the vertical space between the storage containers and the bed to improve safety and convenience when transporting items in the bed.

Other objects and advantages of the present invention will become apparent from the following description of the preferred embodiments taken in conjunction with the accompanying drawings, wherein like parts in each of the several figures are identified by the same reference numerals.

DESCRIPTION OF THE PREFERRED EMBODIMENTS

Figure 1:
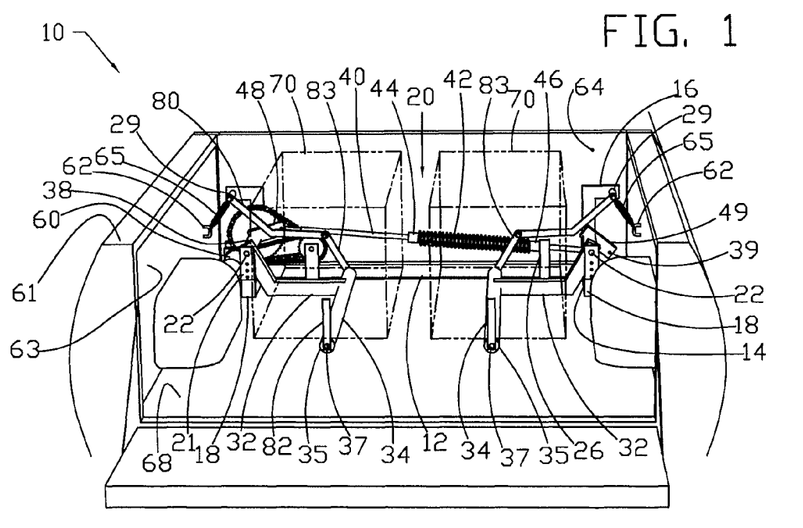
FIG. 1 is a perspective view of a pickup truck storage bed, looking forward from the tailgate towards the cab, showing a truck storage device according to an embodiment of the present invention with storage containers in a stowed position between the bed rails.
Figure 2:
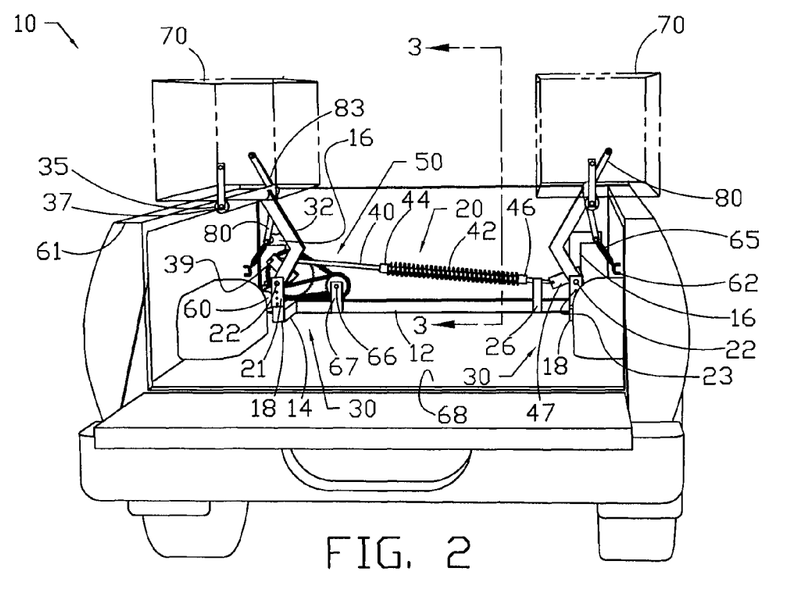
FIG. 2 is another forward-looking perspective view of the truck storage device of FIG. 1. showing the containers in an extended position above the bed rail.
Figure 3:
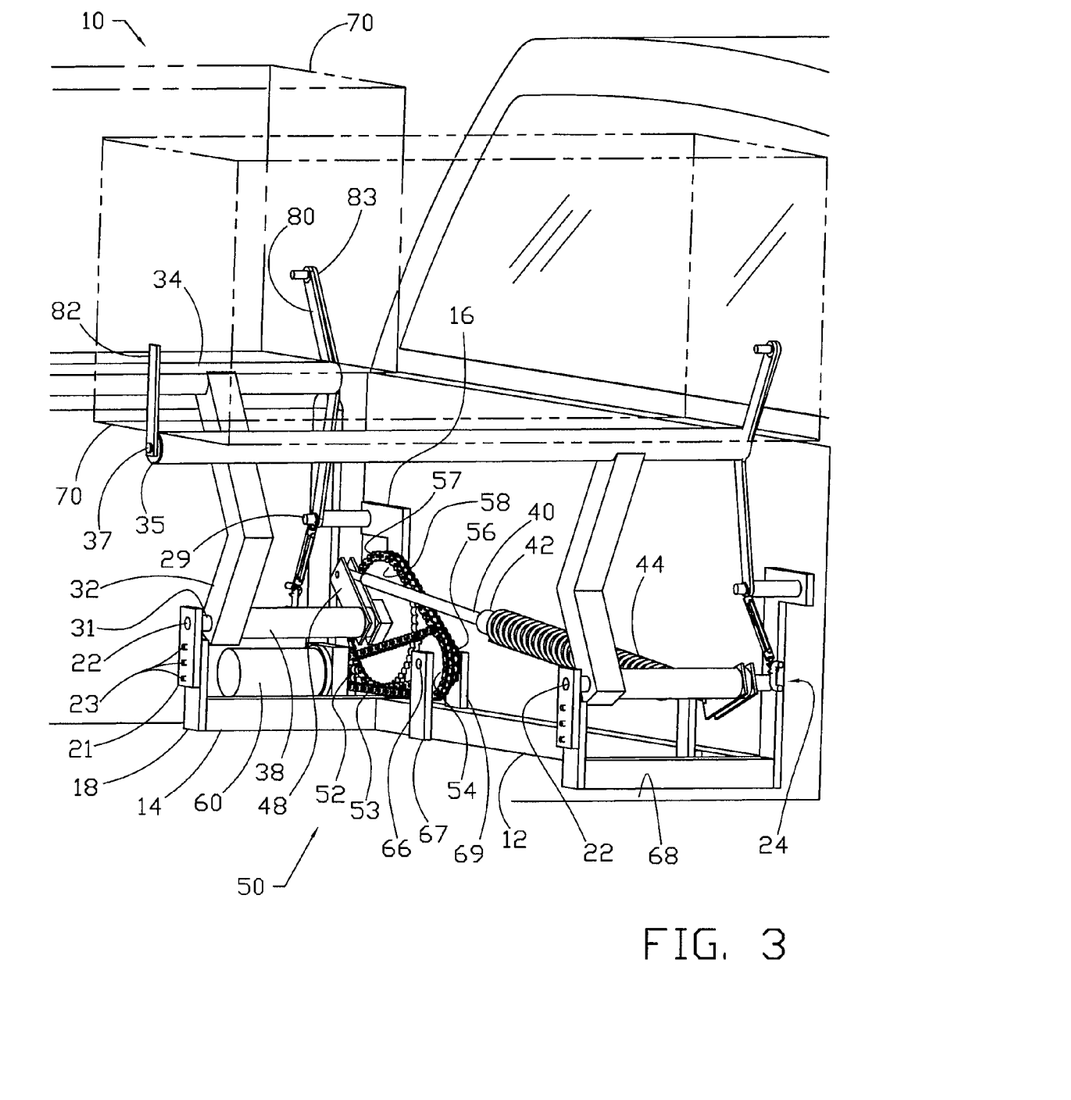
FIG. 3 is a close-up perspective view of a drive system used to lift and lower storage containers according to an embodiment of the present invention.

A pickup truck storage device, generally indicated 10, according to the present invention, as shown in FIGS. 1-3, includes a frame 20 that drops into the bed of a pickup truck, lift arms 32 having respective first ends pivotally connected to the frame at pivots 22, and storage containers 70 pivotally connected to respective second ends of the arms. As shown, the frame 20 anchors to the manufacturer-installed mounting loops 62, located on each side of the truck bed on the inner wall 63 of each side rail 61 and near to the corner adjoining the cab bed wall 64, by way of a mounting member 65 in the form of a turnbuckle having hooks or other attachment means at each end. The lower end of each left and right hand located turnbuckle hook 65 attaches to their respective truck loop 62, and the opposite upper end of each left and right turnbuckle 65 attaches to the device 10 at each pivot anchor stud 29. Tightening the left and right turnbuckles 65 places the mounting member in tension and increases the hold of the device 10, disallowing side to side movement, as well as, preventing tipping over as the weight of the containers and contents overcome the weight of the device behind the fulcrum points located at the forward edge of the forward upright frame member 18 at point of contact with truck bed surface 68.

Other methods of installation may include bolting through the rear upright frame member 16 and through the bed wall 64, and/or bolting through the bridge tube frame member 12 and down through the bed floor 68.

If an individual prefers not to alter his current truck cargo space during installation, other means of stabilizing/mounting the device 10 are available and may include use of a left and right rigid brace members that would attach to and/or wedge between the device 10 and one or both bed side rail walls 68 and/or the tailgate wall corner. Another system for stabilizing/mounting the device 10 that would not alter the truck bed or bed walls, can include various compression means and use of high friction material to push against a series of bed surfaces while also anchored to the device 10. Another mounting method includes clamping the device 10 to the cab bed wall 64 using frame extension members and clamping means up and over and to the cab bed wall 64, example shown in FIG. 8, where over rail clamp 365 is positioned to grab hold of top of bed rail 64, while held tight within device 310. Another non bed altering method is shown in FIG. 9, where pivotal wedge leg brace 413 is firmly pivotally housed within frame base member 414 such that a left and right hand leg brace 413 would each be rotated and locked to press firmly against their corresponding bed side rail 63 to disallow side to side movement, while the leg brace's forward foot 415, provides footing to prevent tipping of the device. Rubber components could be added and attached to this pivotal wedge leg brace to dampen noise, reduce potential damage to the truck, and provide frictional support.

Each left and right storage container or unit 70 of the present invention, shown in FIGS. 1-3, travel back and forth in a guided arcuate path as defined by the rotation action of the left and a right arm support members or lift arms 32 having a horizontal axis of rotation defined by in-line pivots 22 and 24. Lift arms 32, which are preferably made of structural steel tubing, each have one end fixed to a sleeve tube member 38 made of steel tubing or pipe, so that together, as one, the arms rotate about their corresponding left and right horizontal axes that run longitudinally through the forward pivot 22 and the rear pivot 24. It should be understood that other materials can be used, such as aluminum, titanium, cast iron, carbon fiber, and others, to construct the device 10 as well as other embodiments shown and described herein.

At the axis core running in between and in-line with points 22 and 24 and affixed to the rest of the arm weldment or assembly 30 components, is pivot rod or axle 31, shown in FIG. 3. Each end of each identical left and right pivot rod 31, is milled to a smaller diameter, to fit and rotate smoothly within bushings that sandwich the pivot rod 31. The forward bushing is press fit into the forward cap plate 21, while the rear bushing is press fit into the rear frame upright bar 16. Bushings are not functionally necessary as rotation is relatively very slow. The desired sandwich affect is obtained upon assembly of the arm weldment 30 to the main frame 20, as the rear end of the pivot rod 31 is first inserted into the rear pivot 24 located within the rear frame upright bar 16, then opposite/forward end of pivot rod 31 is inserted into forward pivot 22 of cap plate 21, which same cap plate 21 is then bolted to the forward frame upright bar 18 by securing with bolts 23. Permanent assembly may be preferred in factory as consideration of manufacturing cost, shipping and user preference is established.

Generally simultaneous opposite mirror image like movement between the left arm weldment 30 with the right arm weldment 30 is orchestrated by the linking of the left and right arm weldments 30 through a rigid linkage means control bar 40, having opposite end mounting holes through which pivot locking pins 39 or bolts are to be inserted. Control bar 40 mounts to each arm weldment 30 through attachment to both the left drive bracket 48 and right driven bracket 49 by use of same pivot locking pins 39, which allow each end of the control bar 40 the freedom to pivot within each bracket 48 & 49 as the brackets rotate along with and as part of each arm weldment 30. Brackets 48 and 49 each are affixed to their corresponding pivot rods 31, as well as, to sleeve tubes 38. The additional use of sleeve tubes 38 is to add greater strength to the structure as torsional forces upon components fixed to the pivot rod 31 can be great due to the offset distance from pivot axis 22/24 by cantilevered weight of the containers especially when full with storage items. The larger diameter of sleeve tube 38 provides further weld attachment area for those components that also are affixed to rod 31, thus reducing the chance that the bracket could break free of its weldment which would result in the right driven arm weldment 30 being able to rotate free of any control by the drive and locking means of drive transmission system 50.

The pushing and pulling action resulting from the union between the left and right arm weldments 30 through their connection by the control bar 40 creates substantial stress upon the frame uprights 16 and 18, which is why these two frame elements may be securely fixed to, or welded to and made a permanent rigid part of the frame 20. An alternative rotational drive system which also causes the arm supports 32 to rotate in simultaneous fashion to lift and lower the position of their supported container(s) 70, will be described later (FIG. 4), whereby the pulling and pushing forces acting between the left and right components is substantially reduced. It should be noted that simultaneous movement may or may not be the preferred movement pattern for alternative designs within the present invention created to position container(s) about the cargo area of the truck while maintaining the storage containers or unit(s) in a generally upright position or orientation in which items contained in the storage unit may be accessed in the normal manner intended (e.g., via side-facing access openings in the containers). It will be appreciated that, by maintaining the containers in a generally upright orientation at all times, the organization of the contents can be better maintained and there is less chance of spillage.

The present invention 10 controls the movement of the left and right storage containers 70 as the containers are supported directly above their corresponding container supports 34 which in turn are affixed in perpendicular relation to their arm supports 32 and further their position is in line with and parallel to the horizontal axis running between forward pivots 22 and rear pivots 24. This arrangement ensures that the container supports 34 along with supported containers 70 maintain parallel position to the rotation axis during all moments of travel.

It is most desirable that the containers 70 maintain their upright position during all moments of travel, so as not to disturb container contents beyond the outside normal jostling action of the vehicle during normal and anticipated driving. In the embodiment shown in FIGS. 1 & 2, the upright stance of the containers 70 in the device 10 is maintained through the use of a four bar parallelogram linkage system, where the four pivot points and linkage arrangement works as follows:

The first pivot location is defined by and corresponds to the axis between the forward pivot 22 and the rearward pivot 24. The opposite end or second pivot of this first linkage bar 32, is the center axis within core of the support tube 34. A distance, for example 15½ inches is defined between the two parallel running axes defined just above. The second control bar linkage 80, is offset to and corresponds to the "first linkage" having opposite pivot points spaced at a distance, for example, 15½ inches. The offset parallel distance between the two linkages is substantial enough to provide a greater level of stability against container tilt. For example: If the alignment of the pivots of the first bar lined up on the same vertical plane, near to, or tilted on an inward angle within the frame space 20, as the second bar, then as the first and second linkage bars 30 & 80 making up the "four bar" linkage system, overlap, as the container rises near to the highest elevation; stability would greatly decrease, whereby the container could easily tilt in either direction. The present invention 10 eliminates that possibility by configuring the location of the second upper linkage bar 80 a few inches up, as well as, a few inches outward toward the bed side rail, to accommodate the preferred maximum rotational travel of the container to about 30 degrees beyond vertical, the location most easily accessible for handling container contents at street standing position, or to provide the maximum free cargo bed volume for hauling or storing cargo. The second linkage of the four bar parallelogram linkage system is linkage bar 80 positioned parallel to the first "bar" and offset above and outward from "first bar" where the first pivot end location is upon frame stud 29 and a second opposite end of linkage bar 80 is pivotally attached through the rear mounting plate 83 and then into the container rear side wall at a distance, for example, corresponding to a 15½ inch distance, at pivot 37.

The four bar container stabilizing system mounts to the containers through the use of a forward box mounting plate 82 and an opposing rear mounting plate 83. These two plates, as shown, bolt to the container at each end of that same container such that a lower pivot stud 37 affixed to the lower end of each plate 82 & 83, engages with the container hinge insert 35, located and firmly pressed into each end of the support tube 34, whereby the center hole of the insert 35 provide pivotal bearing housing for engagement with the pivot stud 37 of each corresponding mounting plate 82 and 83. The preferred arrangement aligns the container to sit upon the round container support tube 34 which further provides additional support to the bottom structure of the containers, so as to reduce the necessity for potentially weighty structural container bottom side material. Pivot studs 37 define axes of rotation about which the storage containers 70 may pivot while being moved by arms 32, the axes being horizontal and longitudinally oriented in the embodiment shown if FIGS. 1-3.

Driving the system into operation on the device 10 is a motor 60 bolted to the frame 20 and wired to the truck battery (or a dedicated battery) and having a control switch located at the rear end of the truck bed, where the operator has clear view of the device's operation and any potential obstructions. Other ways the motor can be controlled may include: remote control, switch activation from within the vehicle which may rely on sensors, limit switches, or other means to ensure safe use of this device. One such sensor may sense a disturbance through continuous computer analysis of load and gravity as load rotates about axis 22/24. If the sensor detects an unexpected disturbance due to interference with an object or glitch in the system, the sensor may cause the system to reverse direction or shut down.

An example of a motor 60 that can be used in this instant invention (e.g., shown as FIG. 3) is a 12 volt (truck battery powered) 1.1 horsepower winch motor having a planetary gear system rated to pull 3000 pounds, modified and fitted with a small drive sprocket 52, by removing the manufacturer's winch cable and cable spool and replacing that spool with a modified shaft to mate with the planetary gear system of the winch and to which the drive sprocket 52 is permanently affixed to rotate as the motor operates.

The drive or transmission system 50 works as follows as the motor 60 is set in motion: First drive sprocket 52 by way of first drive chain 53 causes driven larger sprocket 54 to move at a slower greater torque geared down rate which in turn must cause rotation of second small drive sprocket 56, as sprocket 56 and 54 are welded together and rotate about same pivot rod 66. Pivot rod 66 is firmly held in place and allowed to rotate within bushing that are mounted within forward frame transmission bar 67 and rear frame transmission bar 69, which are both welded to base bridge tube 12 such that the pivot axis center of pivot rod 66 runs parallel to pivot axis 22/24 and motor drive shaft. The rotation of second small drive sprocket 56 drives large arm weldment sprocket 58 to rotate by way of second heavier gage transmission chain 57. As large arm weldment sprocket 58 is affixed to and part of arm weldment 30, its rotation directly causes all shared components affixed to same left arm weldment 30 to rotate. Therefore further, as the motor rotates counterclockwise, the arm weldment 30 inturn rotates counterclockwise, thus lifting the containers 70. The right side container 70 is generally simultaneously caused to lift, as best shown in FIG. 1-3, as control bar 40 is placed in tension as drive bracket 48 rotates counterclockwise, thus pulling against driven bracket 49 and causing bracket 49 and rest of right arm weldment 30 to rotate clockwise, thus lifting the right container 70.

To further aid in the lifting effort of the left and right containers 70 is the added lifting force generated by a compression die spring 42, which generates its greatest force at nearly optimal time and rate throughout the range of travel of the containers. Without any additional lifting support to the system, the greatest strain or stress on the transmission system 50 and motor 60 would be when the containers 70 are nearest to their lowest or stowaway position. This is due to the greatest influence of gravity being when the offset distance of the containers 70 and their relationship to their pivot axis 22/24 nears to 90 degrees away from the vertical plane. Conversely, when the containers 70 are lifted to their highest position where the pivot angle from vertical plane is closest to zero degrees, where the alignment of the container support axis 37 is directly above axis 22/24. At this point, there is theoretically no load stress caused to the transmission system 50 and motor 60.

There are a variety of options available to counterbalance and create a more consistant load strain upon the transmission system 50 and motor 60 throughout the range of travel of the combination arm weldments 30 and containers 70, which might include: compression and/or extension springs, gas springs, torsion springs, or the like. On this device 10, as mentioned above, a die spring 42 is installed over the control bar 40 with locking means to limit movement upon the control bar 40, through use of lock collars 44 which clamp to control bar 40 and are positioned at a strategic location to maximize the counterbalance affect. At the opposite right end of the die spring 42 is a stop sleeve 46 which may travel free upon drive bar 40, as pressure may be exerted by the pushing action of die spring 42. Preventing the stop sleeve 46 from slipping to a position further to the right and away from the die spring's influence, can be found, a pair of frame stop bars 26, which are welded to frame bridge tube 12, which allows the drive bar 42 to freely pass back and forth within and between the frame stop bars 26, yet the spacing of the two stop bars 26 is narrow enough to prevent the stop sleeve 46 from passing to the right. The length of the die spring is long enough to allow a compression length long enough to accommodate the generally horizontal displacement distance created by the arc movement of driven bracket 49 which is push driven by the control bar 42 when in lifting mode. Device 10's arm weldments 30 rotate a total of about 130 degrees each from the fully lowered position to the furthest raised/widened position, whereby the linear generally horizontal displacement of the drive and driven brackets 48 &49 is about 7 inches on this device 10. These dimensions may vary slightly as the device might be custom adjusted to ideal performance for use in a particular trucks having their own particular bed rail width and height dimensions.

It should be appreciated that device 10 could have one or a few adjustable components to allow maximum performance to the user or owner's preferred truck having its own unique set of dimensions. Such an adjustment may involve adjustability to the overall width of the device 10 where the bridge tube frame member 12 may have an adjustable coupling. The lift arms 32 may also provide a length adjustment allowing the distance between the pivot rod 32 and the box support 34 can be customized to best suit the specific truck in which the device is installed. Another adjustment may include shims to change the distance between the bottom of the device 10 and the truck bed floor.

Figure 4:
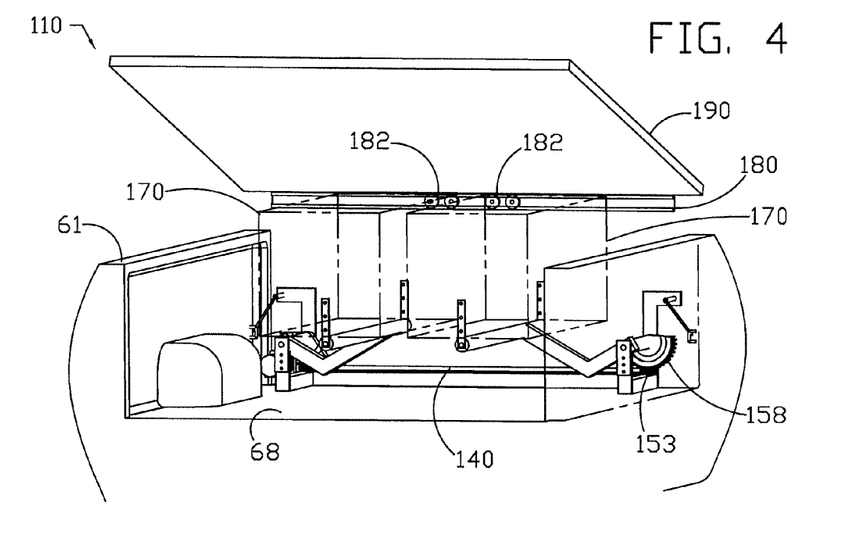
FIG. 4 is a forward-looking perspective view of a pickup truck storage bed showing a another embodiment of a truck storage device according to the present invention, showing storage containers lifted a short distance above the truck bed and having an optional tonneau cover anchored to a rail which may also serve as a container tilt prevention means. Also shown in this Figure is an alternative drive system.

Further explanation as to how, in this device 10, the die spring 42 provides upward lift to counterbalance and even-out the torsional load about axis 22/24 as the load of the boxes, arm weldment (and the potential added load of an optional attached tonneau cover 190, as shown in FIG. 4) apply during the travel range. The die spring 42 is adjusted through the positioning and locking of the lock collars 44, such that when the containers 70 are lifted to their highest position the die spring is relieved or non compressed having no displacement. As the boxes 70 lower, however, the control bar 42 travels to the right, the stop sleeve 46 becomes jammed against the frame stop bars 26 and therefore the die spring 42 begins to compress and its pressure increases as the containers 70 continue to lower, whereby the die spring 42's pressure is greatest when the containers 70 are at bottom. It should be appreciated that the counterbalancing force selected for other such devices of this present invention may be chosen to be great enough to overcompensate most, all, or beyond the load created by the containers 70, for safety reasons and/or to allow a smaller power and/or transmission source or to allow easier manual manipulation by the operator.

It should be appreciated that the linkage system and transmission used on this device 10 was developed as a more reasonable cost effective means to construct the prototype that further tested the concept.

Another embodiment 110, shown in FIG. 4, shows a variation of device 10 having an alternative drive system that eliminates the need for use of chain and sprockets, and further, does not require a control bar 40. Device 110 of the current invention uses a left and right winch-like gear 158, mounted to and their corresponding axis rod 31, to be driven by a left and right corresponding worm gear 153. The left and right hand worm gears 153 are linked together to be rotated simultaneously by a single drive shaft 140 upon which they are mounted and affixed at each end of same drive shaft 140. It may be found desirable to incorporate into this system use of various size change gears or other means to further create mechanical advantage so as to reduce the size of winch gears 158 and worms 153. One particular advantage of this concept as compared to device 10, is that there is less stress on the frame and certain other members as the control bar 40 no longer pushes and pulls to drive the right lift arm assembly 30 on the device 110. Various other drive systems to lift and lower the containers in a similar pattern or path as this device, may include use of change gears, linear actuators, winches, or other geared systems that may generate large pulling or lifting forces.

Figure 5:
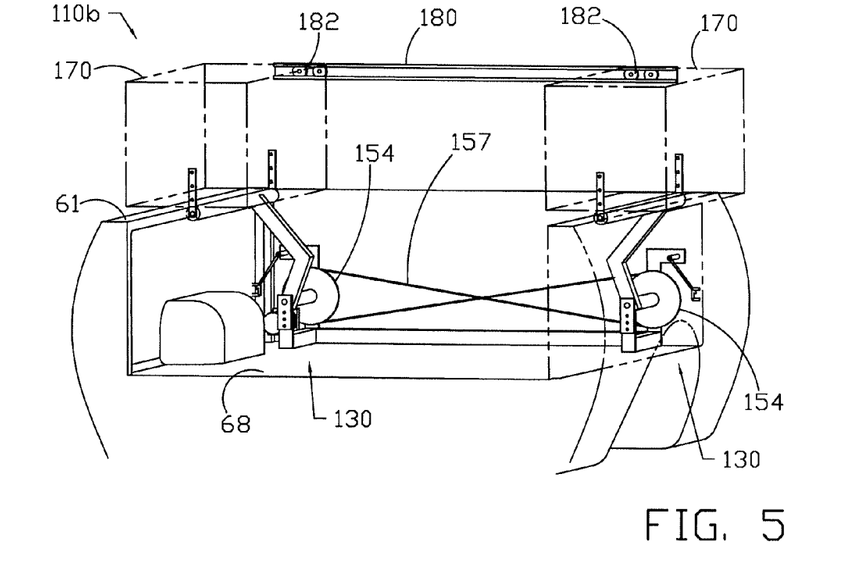
FIG. 5 is a forward-looking perspective view of a pickup truck storage bed showing another embodiment of a truck storage device according to the present invention with storage containers in an extended access position. Also shown in this figure is an alternative drive system.

Device 110 & 110b according to the present invention, shown in FIGS. 4 & 5, are also designed to drop-in to the bed of a pickup truck and be secured in similar fashion as device 10, 310, and 410. Both device 10 and 110 lift and lower the containers 70 and 170 to and from a stowed position near to or upon the bed surface 68, as well as, to an extended position more easily accessible atop the bed side rail 61. This device 110 & 110b uses an alternative stabilizing means to ensure the containers 70 maintain an upright position throughout their rotation about axis 22/24, by incorporation of horizontal track bar 180 and guide rollers 182, which allows elimination of bar 80 of the four bar linkage system used in device 10. The horizontal track bar 180 also provides a platform from which an optional tonneau cover 190 may mount. The tonneau cover 190 may mount to the horizontal track bar 180 using hinges that allow the cover 190 to pivot up, as shown in FIG. 4. Gas shock or other means may be incorporated into the tonneau cover system to aid in the lifting and/or holding the cover 190 in a stationary position. A secondary track guide system may allow the gas lifting springs to mount to the cover 190 yet, provide a means to which the containers 170 may freely move inward and outward relative to the cover 190, or the gas lift assist cylinders could be mounted to one or both containers at the cylinders' lower ends, then engage a track system mounted on the underside of the tonneau cover 190 to accommodate the inward and outward movement of the containers 170. Track bar 180 may also support or become part of a ladder rack system.

Device 110b shown in FIG. 5 shows the containers 170 in their extended access position and the same containers 170 conducted to move in simultaneous opposite fashion, by use of a pulley or sprocket 154 affixed to and apart of each left and right lift arm assemblies 130 and coupled to one another by a "x" cross pattern configured cable, chain, and/or belt 157. Additional drive means may directly drive one drive pulley or sprocket 154 or may be configured into and in between each left and right driven member 154 to simultaneously drive both left and right member 154.

Figure 6:
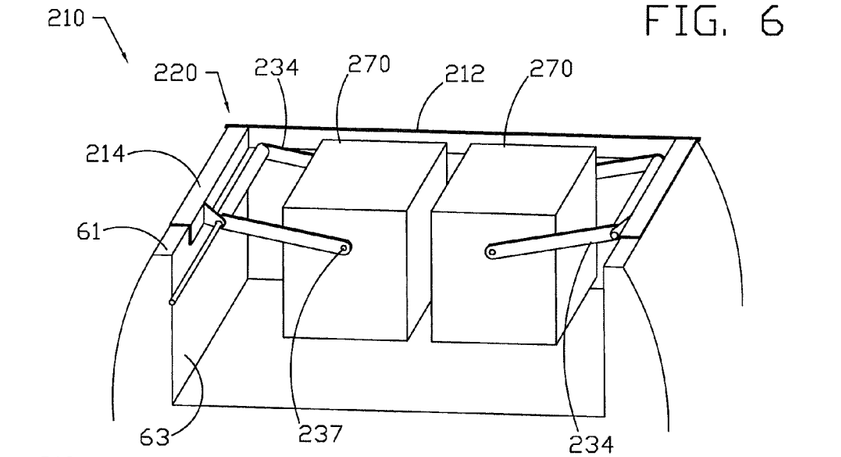
FIG. 6 is a forward-looking perspective view of a pickup truck bed showing another embodiment of a truck storage device according to the present invention mounted on the truck bed rails, with the storage containers in a stowed position.
Figure 7:
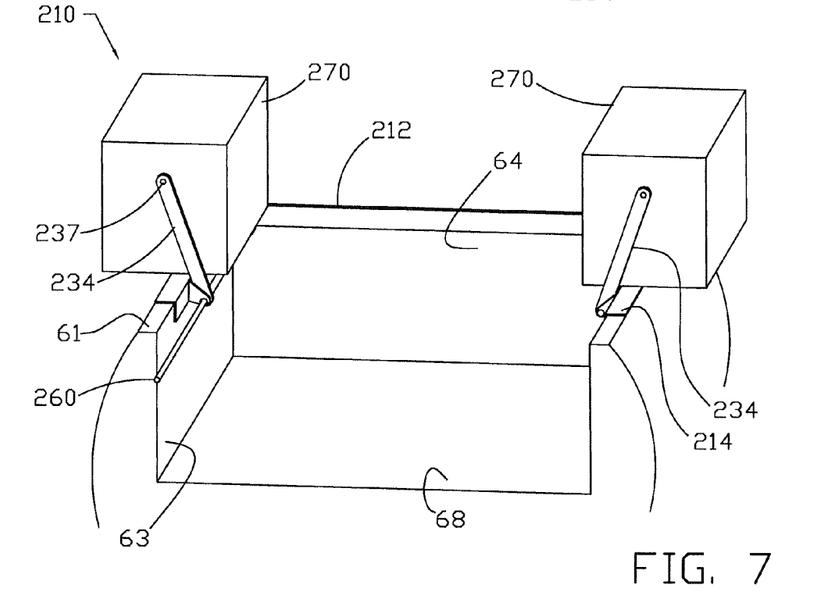
FIG. 7 is a forward looking perspective view of the embodiment shown in FIG. 6 showing the storage containers in an extended access position.

Another embodiment of the current invention labeled 210, shown in FIGS. 6 & 7, also provide lift means for positioning containers 270 to and from a stowed position near to or upon the truck bed surface 68 and by way of rotational means cause the same containers 270 to travel to and from an extended position over top or beyond the truck bed rails 61, while maintaining the containers 270 in a generally constant upright orientation or tilt.

This device 210 relies on a gravity system to maintain the upright orientation or tilt of the containers 270, by having the containers 270 mounted to arm support bracket weldments 234 such that the pivotal engagement attachment location is located at corresponding front and rear ends of each container 270 at a center position on the horizontal plane raised substantially above vertical center, to allow gravity to generally keep containers 270 upright. The higher up the corresponding pivots 234 are upon the containers 270 (up to and including a pivot axis located above the containers), the greater the efficiency gravity will overcome any imbalance of weight within the containers 270 by the contents stored inside, as well as, the influence of any forces generated during the time the vehicle is in motion. A secondary locking mechanism may be added to the system to ensure the boxes remain held in an upright orientation or the addition of a horizontal guide bar similar to 180 seen in FIGS. 4 & 5. It should be appreciated that the tonneau cover system may be incorporated into any embodiment of this present invention.

The device 210 uses an alternative frame configuration including support means 220, to further allow the cargo space of the truck to be more open, and more closely conform to the inner periphery of the cargo/storage bed during such times the cargo space may be used to haul materials such as dirt and gravel, where having frame components of the device of this current invention, sitting within the bed space, especially upon the bed surface, may hinder removal and cleanup of this type or similar kind of lose cargo.

A further advantage of this design, ensures that the containers 270, move about the bed rail 61, in nearly identical fashion, regardless of what truck manufacturer brand the device 210 is installed. To this end, the device 210 includes frame members 214 in the form of L-shaped brackets as shown, U-shaped brackets, or the like, to engage upper edges of the bed rails 61. Adjustable means incorporated into the frame bridge member 212, to shorten or lengthen this member, may allow the side frame members 214 to sit upon each bed rail 61 in similar fashion from one truck brand to another. It should be appreciated that a similar alternative frame design may be created, whereby the side frame members 214 may be located in a drop-off position (e.g., an interior ledge) to not sit upon the bed rail 61, but rather near to, as it may be preferred that the manufacturer's bed rail 61 remain undisturbed. Some manufactures provide anchorage means, such as threaded wall anchors within the side bed walls 63 and cab bed wall 64, for the purpose of securely attaching after-market products designed to further enhance the use of the cargo area of the truck, for which this device could be designed to take advantage of for mounting and positioning this device 210 or similar variation.

As mentioned previously, a variety of power sources or drive systems could be used to operate or generate power to drive and cause the containers to travel. In this device 210 an extension member or drive shaft 260 may be manually rotated with a hand crank lever or driven by a portable drill to raise and lower the containers 270 about their axes of rotation. A variety of means (transmission and/or counterbalancing spring or spring-like means) may be coupled to this extension member 260 to create a reasonable mechanical advantage making manual or drill driven operation possible.

Figure 8:
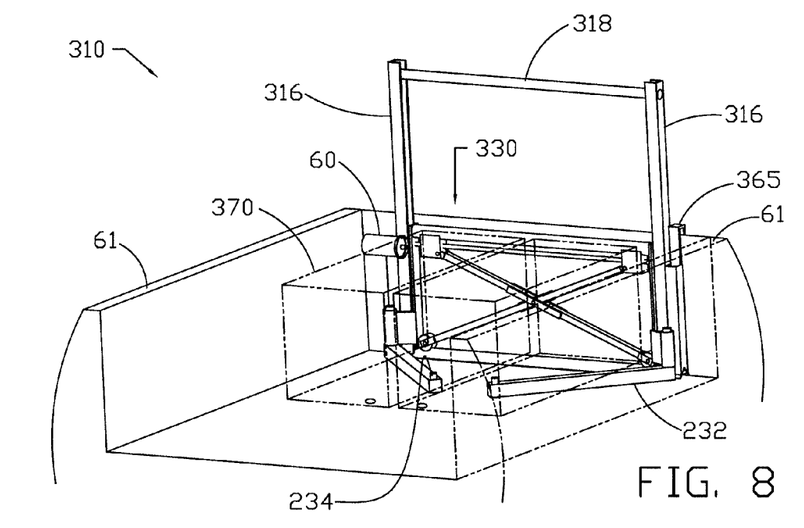
FIG. 8 is a forward-looking perspective view of a pickup truck storage bed showing another embodiment of a truck storage device according to the present invention with storage containers in a stowed position.
Figure 9:
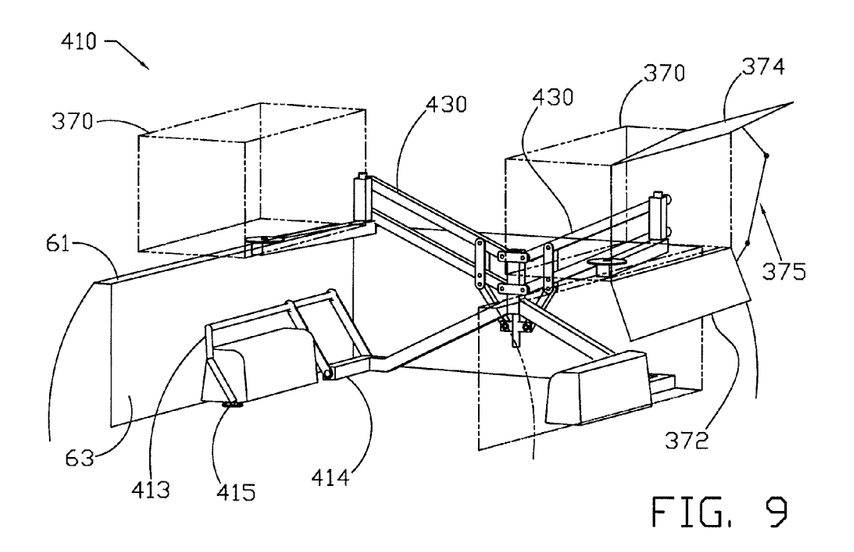
FIG. 9 is a forward-looking perspective view of a pickup truck storage bed showing another embodiment of a truck storage system according to the present invention with the storage containers in an extended position.

Another embodiment of the current invention, is shown in FIGS. 8 & 9. In these embodiments, the device 310 & 410 moves the containers 370 about using a alternative means and travel path of movement of the containers 370. As device 10, 110, 110b, and 210's movement of the containers 70 & 170 could generally be described as a rotational lifting and lowering positioning travel path, while device 310 could generally be described as an up and downward vertical lift and lowering movement coupled to a separate inward and outward swinging of the containers 370 on a horizontal plane.

Each left and right container 370 is pivotally mounted to sit atop their corresponding left and right lift arms 332 after each container 370 mates with the round vertical pivot rod mount 234. The mating of the container 370 is made possible as each container 370 has a mounting hole, with our without a sleeve insert securely positioned within each box 270 at a location in general center of container base location. The mounting method used should allow each container the ability to rotate about their pivot rod 334 with close enough tolerance whereby each container always remains upright, throughout its rotation along the horizontal plane. A variety of options are available within the lockable container for securing each container 370 to their pivot rod mount 234, to disallow the ability to lift off the containers unless locking means were to be removed.

Device 310 is shown in FIG. 8 having containers 370 in the fully lowered or stowed position as well as rotated along the horizontal plane to butt close to one another.

Device 310 may also drop in and easily be installed into any size pickup truck, and may be secured and held into position using the variety of methods described earlier to secure the earlier described devices. A difference between this device 310 and earlier devices described, is the use of frame tracks 316 which guide the lifting and lowering of the carriage system 330, and which has a stature whereby the upper portion of the frame tracks 316 stands above the top of the bed rails 61. Some customers may find the frame tracks 316 useful, as the frame tracks provide a convenient mounting platform for the addition of ladder rack cross bar 318. It should be appreciated that it is possible and may be desirable for the frame tracks 216 to fold down when the containers 370 are in stowaway so as to reduce the visibility of the apparatus and could provide further security and may even be a further method upon which a tonneau cover system could mount and function.

Alternative device 410 shown in FIG. 9, is similar to this device 310 in that the containers 370 are positionable by using both a vertical lift and lowering system, coupled to a horizontal swinging inward and outward system. Device 410, however, eliminates the need or use of frame guide tracks 316, by using a left and right four bar parallelogram linkage system 430 to move the containers 370 along the vertical plane. The advantage of this device 410 over device 310, is that all components when in stowaway mode, are hidden below the top of the truck bed rails 61.

Also shown in this FIG. 9 of device 410, is a container 370 illustrating a split access door design, such that the lower door 372 hinged to the lower portion of the container 370 is linked to the upper door 374 through linkage means 375, such that the weight of the lower door 372 is used to counterbalance or offset the weight of the upper door 374 hinged to the upper portion of same container, resulting in a system requiring no additional means, such as gas springs typically used to lift and maintain the access door in an open position. This design further provides protection to the outside truck body in case a storage object falls or is dropped when inserting or removing from the container 370. It will be appreciated that the split access door design can be used in any embodiment of the present invention.

Another adaptation to the containers, may include means to allow easy removal of the same containers from any embodiment of the present invention such that the containers may be removed and/or reinstalled. This act may be desirable to further open up the cargo space, provide easier access to the device or truck for maintenance or cleaning, or perhaps to accommodate the use of containers that may be made mobile for such use closer to job or recreational site. Modification to the device's container support structure at or near the attachment point to the container(s) may provide an easy method to accomplish this feature. A device of this current invention may be modified to allow the containers to attach and detach from within the cargo space and/or from the access position or position beyond and nearer to the ground.

As the above mentioned and described devices can be installed into a variety of trucks as after-market products, it should be understood that it may be desirable to have a version of this current invention as to be manufactured into a vehicle by the manufacturer of that vehicle, whereby certain components of the device may be made less visible or made apart and share the surrounding structure. For example, the frame of the device can be incorporated into the cab-side wall of the bed and/or the rails so that the arm assembly and containers are the primary exposed components.

Device 510, shown in FIGS. 10-14, illustrates an example of a more detailed drive system 550 of nearly otherwise identical device 210, shown in FIGS. 6 & 7. This device 510 may be driven into operation, maunually, by portable motor device, permanent mounted motor, or motor driven with the ability to also manually operate; useful as a backup if the motor fails to operate, or if quiet operation of the system is preferred.

Figure 12:
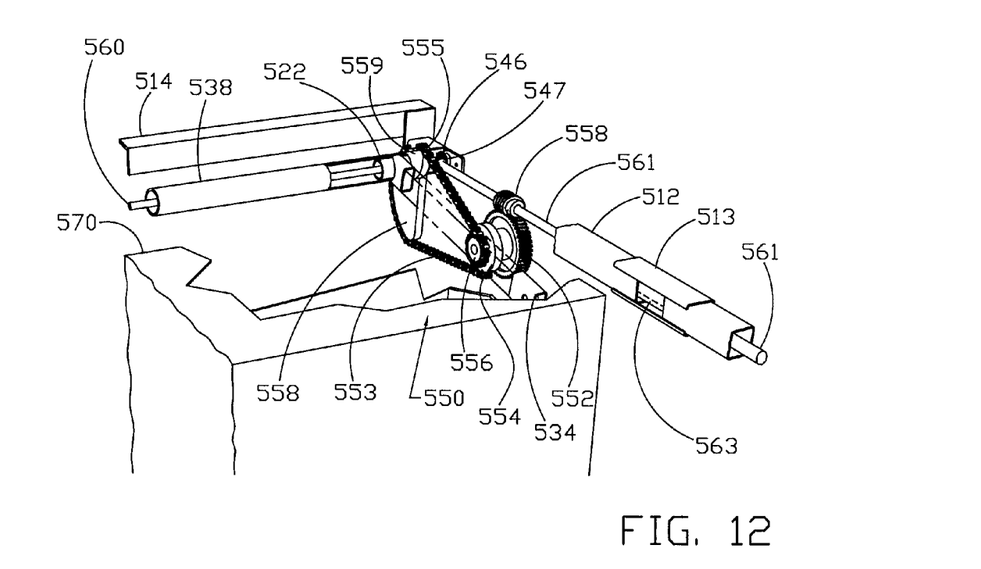
FIG. 12 is a close-up perspective view of the drive system shown in FIG. 10.

Operation of the device 510 begins with the rotation of first drive rod 560, best shown in semi cut-away close-up view in FIG. 12. The drive rod is housed and held in a center axis allignment within container support bracket bridge tube 538, and more specifically held into that center axis postion and free to rotate, within frame pivot extension 522 and rail mount support bracket 521 which both have a through hole only slightly larger than first drive 560. Affixed to the opposite end of first drive rod 560 is gear 546, whereby the rotation of rod 560 and gear 546 transmit rotation to perpendicular mounted mating gear 547 affixed to near end of perpendicular alligned driven rod 561. The mating gears 546 and 547 are shown as bevel gears having the same number of teeth, therefore equal torque is transmitted in 90 degree fashion to rod 561 from source, first drive rod 560. It should be appreciated that a greater or lesser torque could easily, if desired, be generated at this gear juncture, with the substitution of gears having different number of teeth, therefore creating a geared ration greater or less than the 1:1 shown here.

Continuing in the description of this device 510 transmission system 550, as rod 561 rotates, so does affixed to rod, worm 558, which in turn drives mating worm gear 552, generating a boost in torque to the system 550 which helps control movement of each weighty storage container 570. The use of worm gears, besides their ability to generate a large mechanical advantage in a small space, the gears will also benefit the system by offering a means of holding the system in a fixed or locked position when rotation of the drive system 550 is asked to stop, by the operator ceasing to operate the motor or manual source or if there is a mechanical breakdown of any component of the drive system before the worm gear. This feature can be useful when using the storage containers as clamping members to secure items in the cargo bed.

Figure 13:
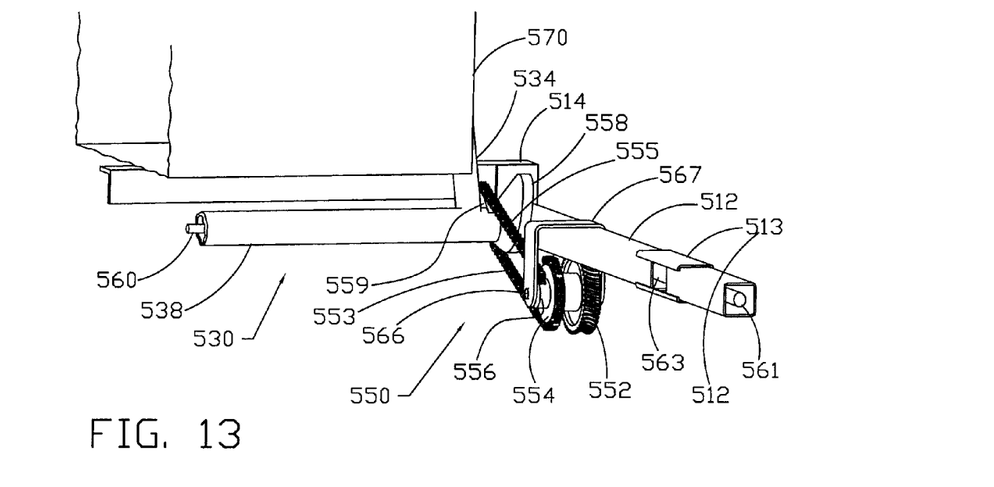
FIG. 13 is a close-up perspective view of the drive system in the embodiment of FIG. 11 showing the drive system holding the containers in a fully extended position.

The worm gear 552 is held in its mating position with worm 558 it is mounted to and free to rotate about pivot rod 566 most visible in FIG. 13. Pivot rod 566 is held into position within frame bracket 567 which same bracket is shown welded to frame bridge component 512. Rotation of the drive system 550 continues, and further transmitted to lift drive spool 554 and lowering drive spool 556, which are both affixed to and rotate at the same rate with worm gear 552.

Figure 10:
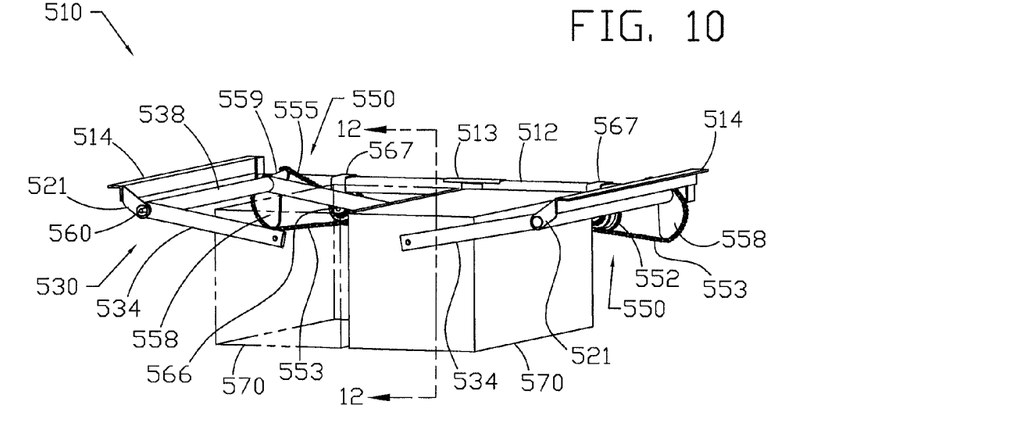
FIG. 10 is a perspective view of another embodiment of a truck storage device according to the present invention that mounts upon the bed rails, with the containers shown in a stowed position.
Figure 11:
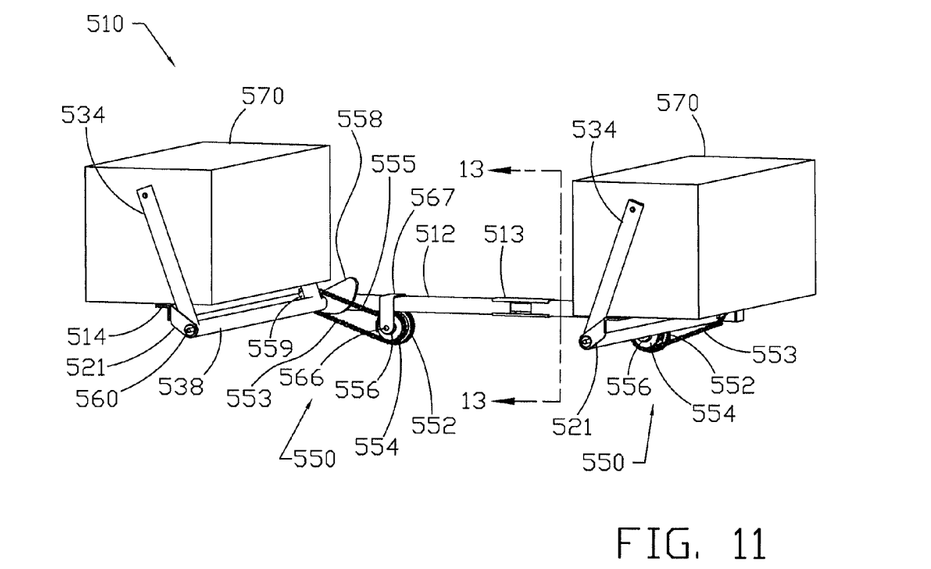
FIG. 11 is a perspective view of the embodiment shown in FIG. 10 with the storage containers in an extended access position.

The lifting of the storage containers 570 is best shown in FIGS. 10 & 12. As the worm gear 552 is caused to rotate, so must lift drive spool 554, which has leaf chain segment 553 attached to same spool at chain's first end, therefore causing chain 556 to rotate or spool around lift drive spool, placing tension on the chain, which at its second end is attached to lift cam 558, therefore pulling lift cam toward the drive spool. As the lift cam 558 is affixed to bridge bracket tube 538, best shown in FIG. 13, which in turn is rotationally mounted, as the cam is chain driven, the container bracket weldment 530, is forced into a rotational lifting action, therefore raising the storage containers 570.

The use of lift cams 558, are preferred over the use of a round or arc shaped driven spool or sprocket, as a means of counterbalancing the load of the storage units and container arm bracket members 534, which transmit a greater torque on the drive system 550 when lifting or holding in or near the stowaway position. Conversely, when the system reaches the highest lift position, or when arm bracket members run vertical, the least or near zero torque is generated against the drive system. Without the use of spring-like counterbalancing or with their use, the cam having a shape design to offer a greater to lesser mechanical advantage, provides a more consist torque or load against the drive system 550 components before reaching the same cam 558. Consistency of load causes less stress on the motor or manual operator, as well as, may better allow use of a possible safety shut-off control which may be used to protect against a sudden change in the system as a result of something breaking in the system or if an object interferes or over stresses the lifting or lowering operation of the containers.

As lift cam 558 is caused to rotate, tension is fairly consistently maintained, keeping lift chain 553 taut and tightly wrapped around lift drive spool 554, as desired; however, when the system reaches the near highest lift position and beyond, gravity, or momentum could cause the storage containers and support system to fall until the arm bracket supports hit and would be caught by interference with the bed rail angle frame 514. To prevent this undesirable event, a counter system is built into the system, as follows, and best illustrated in FIGS. 11 & 13. Further affixed to worm gear 552 and lift drive spool 554, is lowering drive spool 556. The diameter of this spool 556 has been reduced to allow the use of a near mirror image to the lift cam 558, lowering cam 559, best seen in FIG. 12. In this device 510, it is necessary that the lowering cam 559 be smaller than the lifting cam 558, in order to avoid interference between parts and the truck side rail. The smaller cam size is acceptable, as the lowering chain 555 does not experience large load generated forces due to the minimum angle past vertical the system can only travel. If however, an additional load is placed upon the system due to a possible ladder rack coupled to system or material loaded upon the storage containers, the system may be locked, or placed in vertical or fully accessible position relying on bed rail frame to help support the system. Additional means, not shown, such as counterbalance spring or shock absorbing means may be added.

As the description of this device 510 has focused on one hemisphere of this dual storage container system, it should be appreciated that the device may operate where both hemispheres move their storage units 570 in simultaneous mirror-like fashion caused by the rotation of a single first drive rod 560, shown on the left hemisphere in FIG. 12. The simultaneous operation will be described in the next paragraph. It should also be understood that each hemisphere may be separate and operational each by their own first drive rod or independent means. It may as well be appreciated, that a coupling between each hemisphere may be engaged or disengaged to allow independent movement, simultaneous mirror like movement, or interrupted simultaneous movement.

The simultaneous operation of both hemispheres of this device, simply occurs though the use and extension of driven rod 561, shown in FIG. 12, extending just beyond right hand frame bracket 567, shown in FIG. 10, to drive the identical mirror image lift and lowering components on same right side, as a second opposite hand worm is affixed to same driven shaft 561. A coupling 563, shown in FIGS. 12 &13, is used in this device, to allow coupling and separation of the left and right hemispheres to allow more compact packaging, and to allow the separation distance between the left and right sides to be adjustable to allow the device 510 to be mounted on a variety of truck brands that may have different bed rail dimensional separation. Coupling 563, may be a designed and formed in a variety of effective ways to join the left and right driven rods 561 to cause both to rotate simultaneously. One example, might provide that the coupling is welded to one driven rod while able to slip over and clamp tightly grabbing the other driven rod. A keyway and key may be provided to further ensure positive rotational joining of both driven rods 561.

It should be understood that this device 510 is shown as a mount to and sits upon the side bed rails of the truck, but may be modified to sit within the bed of the truck by mounting to factory supplied side and or back bed wall anchors, or this device may sit upon the bed surface, similar to device 10 shown in FIGS. 1-3.

Figure 14:
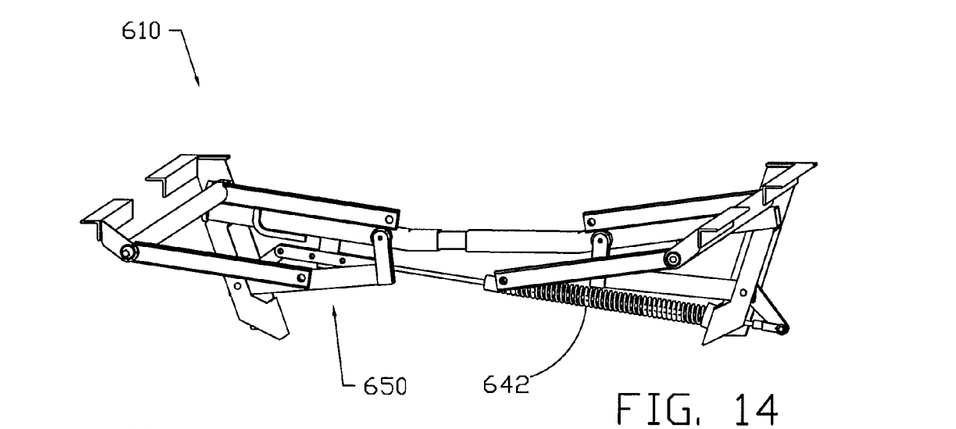
FIG. 14 is a perspective view of another embodiment of a truck storage device according to the present invention using an alternative drive system and having an optional safety container detach feature, shown here in the stowed position
Figure 15:
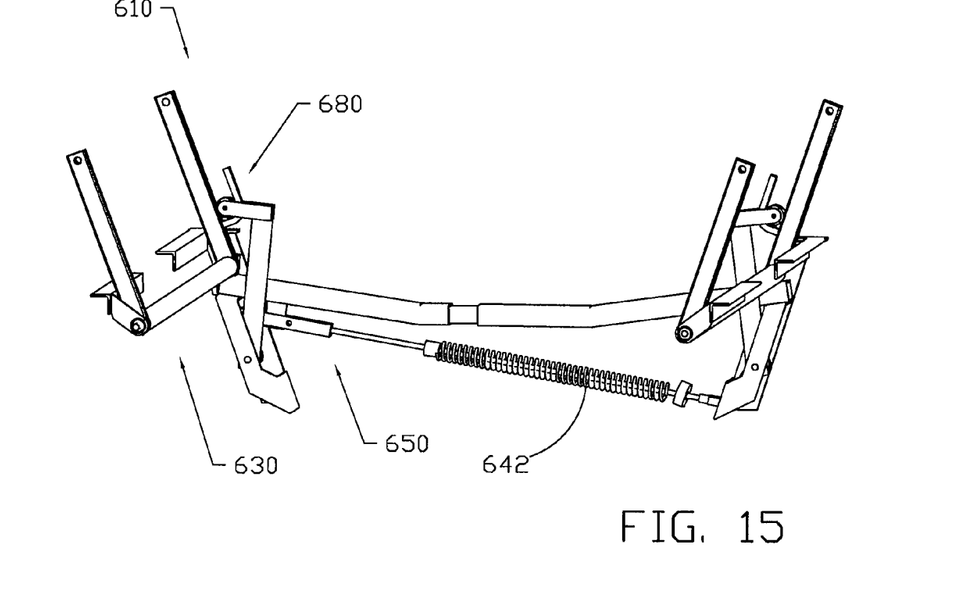
FIG. 15 is a perspective view of the embodiment shown in FIG. 14, shown here in the extended access position.

Device 610, shown in FIGS. 14 & 15 without storage containers for clarity, uses a screw drive system 650, counterbalance compression spring 642, and a type of safety mechanical system 680, where the storage container system 630, disengages from the drive system 650 upon the interference of an item that may sit in the path of the one or both containers as they near the truck bed surface.

While the invention has been particularly taught and described with reference to certain preferred embodiments, those versed in the art will appreciate that modifications in form and detail may be made without departing from the spirit and scope of the invention. For example, a variety of different materials may be used in the construction of this device and its components, including metals such as steel and aluminum, plastics, and combinations of materials.

It will further be appreciated that a ladder rack or tonneau cover system may be incorporated into this device, and a four bar linkage or other means to ensure boxes remain upright. This device may be used not only to vary the position of stored items, or as a ladder rack or maneuvering tonneau cover system, the system may be used to aid in the positioning and transporting of item, by sandwiching items in between the storage containers, or between the storage containers and the bottom of the bed.

Further, a single or dual torque multiplier mechanism(s) may be incorporated into the device as a means of generating large torque to drive or cause the both storage container brackets to rotate/position the storage containers. I came to discover that there are a variety of "torque multipliers" on the market, some for example, specifically designed to aid truck drivers in trying to remove stubborn wheel nuts. These torque multipliers are compact units about the size of a drill without the handle, sometimes made using planetary gears, able to generate 2000 ft pounds of torque with someone manually turning a fairly short crank arm. For my invention, these units could be located within each axis or storage bracket bridge tube, or a single torque unit located just after the manual or motor drive mechanism. Use of such a device(s), would make my invention more compact, no gears or chain exposed to the elements and potential damage by items hauled around.

In addition, it will be appreciated that the device can be configured to be operated locally from within the bed, alongside the bed on the street, or from the cab.

It will also be appreciated that the storage containers may have side-facing access openings and/or top-facing access openings, with or without doors. Additionally, the side-facing openings may face inwardly towards the interior of the storage bed or outwardly towards the street. Bottom and/or sides of the containers may be configured to act as clamping surfaces to secure items in the bed, e.g., by adding friction tape, rubber or foam pads, or grooves along the surfaces to help prevent the items from moving in relation to the containers.

It will further be appreciated that the storage device may be operated by an onboard power source such as a motor or hydraulic system or via a drive member that can be driven by an off-board power source or driver, such as a powered screw/socket driver or drill. When an onboard power source is used, it can be powered by the truck battery or by a dedicated battery for the device. If an offboard power source is used, a drive shaft can extend longitudinally along or in a bed rail, laterally inward towards the bed, or laterally outward through a bed rail, to couple with the power source. Alternatively, the drive shaft can extend through the cab wall.

These and other modifications of the present invention are intended to be within the scope of the appended claims.

The invention claimed is:

1. A storage device for a pickup truck having a storage bed with laterally opposed side rails, said device comprising:
   a first storage container with first and second sides and an upright orientation in which the first side faces laterally inward towards an interior of the storage bed and the second side faces laterally outward;
   a second storage container with first and second sides and an upright orientation in which the first side faces laterally inward towards an interior of the storage bed and the second side faces laterally outward;
   a frame with first and second mounting members configured to engage respective upper edges of the rails and first and second extensions adjacent the upper edges and extending laterally inward from respective first and second mounting members;
   a first lift arm having first and second ends, the first end of the first lift arm being coupled to the first extension for pivotal movement about a first pivot axis and the second end of the first lift arm being coupled to the first storage container for pivotal movement about a second pivot axis;
   a second lift arm having first and second ends, the first end of the second lift arm being coupled to the second extension for pivotal movement about a third pivot axis and the second end of the second lift arm being coupled to the second storage container for pivotal movement about a fourth pivot axis;
   wherein respective second ends of the first and second lift arms are movable along first and second arcuate paths about the first and third pivot axes between stowed positions in which the first and second storage containers are disposed between the side rails and extended positions in which the first and second storage containers are disposed on and supported by the upper edges of the side rails and respective second sides are spaced laterally outwardly from the rails; and
   wherein the first and second storage containers are pivotable about the second and fourth pivot axes, respectively, to maintain the upright orientation of the storage containers in the stowed and extended positions;
   wherein the mounting members are longitudinal mounting members configured to rest on the rails of the storage bed and the frame further includes a cross member extending laterally between forward ends of the longitudinal mounting members so as to be disposed adjacent a forward end of the storage bed when the frame is secured; and
   further comprising a drive mechanism coupled to the lift arm and including a cam configured to provide a greater mechanical advantage in the stowed position than in the extended position.

2. The storage device of claim 1, wherein the drive mechanism is mounted on the frame and coupled with the first and second lift arms to cause the lift arms to pivot and the first and second storage containers to move between their respective stowed and extended positions.

3. The storage device of claim 2, wherein the drive mechanism includes a rotary drive shaft extending longitudinally along one of the rails when the frame is secured.

4. The storage device of claim 3, wherein a terminal end of the rotary drive shaft is adapted to be driven by a portable driver.

5. The storage device of claim 2, wherein the drive mechanism includes a rotary drive shaft extending laterally across the storage bed when the frame is secured.

6. The storage device of claim 1, wherein the mounting members are configured to conform to a peripheral portion of the pickup storage bed to allow substantially unimpeded top access to the storage bed when the storage containers are in the extended position.

7. The storage device of claim 1, wherein mounting members are longitudinal mounting members configured to rest on the rails of the storage bed and the frame further includes a cross member extending laterally between forward ends of the longitudinal mounting members so as to be disposed adjacent a forward end of the storage bed when the frame is secured.

8. The storage device of claim 1, wherein the second and fourth pivot axes are above respective vertical centers of the storage containers, for maintaining the storage containers in the upright orientation between the stowed and extended positions.

9. The storage device of claim 1, wherein the cross-member includes left and right portions connected by a coupling allowing the distance between first and second mounting members to be adjusted.

10. A storage device for a pickup truck having a storage bed with laterally opposed side rails, said device comprising:
    a storage container with first and second sides and an upright orientation in which the first side faces laterally inward towards an interior of the storage bed and the second side faces laterally outward;
    a frame with a mounting member configured to engage an upper edge of one of the rails and an extension adjacent the upper edge and extending laterally inward from the mounting member;
    a lift arm having first and second ends, the first end of the lift arm being coupled to the extension for pivotal movement about a first pivot axis and the second end of the lift arm being coupled to the storage container for pivotal movement about a second pivot axis, the second end of the lift arm being movable along an arcuate path about the first pivot axis between a stowed position in which the storage container is disposed between the side rails and an extended position in which the storage container is disposed on and supported by the upper edge of the side rail and the second side is spaced laterally outwardly from the rail, and the storage container being pivotable about the second pivot axis so as to be maintained in the upright orientation in the stowed and extended positions; and
    a drive mechanism coupled to the lift arm and including a cam configured to provide a greater mechanical advantage in the stowed position than in the extended position.

11. The storage device of claim 10, wherein the frame is configured such that, when secured, the first and second pivot axes are oriented horizontally and parallel to the side rails.

12. The storage device of claim 11, wherein the second pivot axis extends through the storage container.

13. The storage device of claim 10, wherein the mounting member is an L-shaped bracket member configured to wrap around the upper edge of one of the rails.

14. The storage device of claim 10, wherein the drive mechanism is mounted on the frame and coupled with the lift arm to pivot the lift arm about the first pivot axis between the stowed and extended positions.

15. The storage device of claim 10, wherein the second pivot axis is above a vertical center of the storage container, for maintaining the storage container in the upright orientation between the stowed and extended positions.

16. A storage device for a pickup truck having a storage bed with laterally opposed side rails, said device comprising:
   a first storage container with first and second sides and an upright orientation in which the first side faces laterally inward towards an interior of the storage bed and the second side faces laterally outward;
   a second storage container with first and second sides and an upright orientation in which the first side faces laterally inward towards an interior of the storage bed and the second side faces laterally outward;
   a frame with first and second mounting members configured to engage respective upper edges of the rails and first and second extensions adjacent the upper edges and extending laterally inward from respective first and second mounting members;
   a first lift arm having first and second ends, the first end of the first lift arm being coupled to the first extension for pivotal movement about a first pivot axis and the second end of the first lift arm being coupled to the first storage container for pivotal movement about a second pivot axis;
   a second lift arm having first and second ends, the first end of the second lift arm being coupled to the second extension for pivotal movement about a third pivot axis and the second end of the second lift arm being coupled to the second storage container for pivotal movement about a fourth pivot axis;
   wherein respective second ends of the first and second lift arms are movable along first and second arcuate paths about the first and third pivot axes between stowed positions in which the first and second storage containers are disposed between the side rails and extended positions in which the first and second storage containers are disposed on and supported by the upper edges of the side rails and respective second sides are spaced laterally outwardly from the rails; and
   wherein the first and second storage containers are pivotable about the second and fourth pivot axes, respectively, to maintain the upright orientation of the storage containers in the stowed and extended positions;
   wherein the mounting members are longitudinal mounting members configured to rest on the rails of the storage bed and the frame further includes a cross member extending laterally between forward ends of the longitudinal mounting members so as to be disposed adjacent a forward end of the storage bed when the frame is secured; and
   wherein the cross-member includes a tubular member, and further comprising a drive mechanism including a drive member extending laterally through the tubular member.

17. A storage device for a pickup truck having a storage bed with laterally opposed side rails, said device comprising:
   a first storage container with first and second sides and an upright orientation in which the first side faces laterally inward towards an interior of the storage bed and the second side faces laterally outward;
   a second storage container with first and second sides and an upright orientation in which the first side faces laterally inward towards an interior of the storage bed and the second side faces laterally outward;
   a frame with first and second mounting members configured to engage respective upper edges of the rails and first and second extensions adjacent the upper edges and extending laterally inward from respective first and second mounting members;
   a first lift arm having first and second ends, the first end of the first lift arm being coupled to the first extension for pivotal movement about a first pivot axis and the second end of the first lift arm being coupled to the first storage container for pivotal movement about a second pivot axis;
   a second lift arm having first and second ends, the first end of the second lift arm being coupled to the second extension for pivotal movement about a third pivot axis and the second end of the second lift arm being coupled to the second storage container for pivotal movement about a fourth pivot axis;
   wherein respective second ends of the first and second lift arms are movable along first and second arcuate paths about the first and third pivot axes between stowed positions in which the first and second storage containers are disposed between the side rails and extended positions in which the first and second storage containers are disposed on and supported by the upper edges of the side rails and respective second sides are spaced laterally outwardly from the rails; and
   wherein the first and second storage containers are pivotable about the second and fourth pivot axes, respectively, to maintain the upright orientation of the storage containers in the stowed and extended positions;
   wherein the mounting members are longitudinal mounting members configured to rest on the rails of the storage bed and the frame further includes a cross member extending laterally between forward ends of the longitudinal mounting members so as to be disposed adjacent a forward end of the storage bed when the frame is secured;
   wherein the cross-member includes left and right portions connected by a coupling allowing the distance between first and second mounting members to be adjusted; and
   further comprising a drive mechanism including left and right drive members extending laterally along the cross-member, wherein the coupling is configured to be selectively engageable to cause the drive members to move in unison or disengageable to allow the drive members to move independently of one another.

\* \* \* \* \*